United States Patent
Tanaka et al.

(12)
(10) Patent No.: US 6,683,127 B1
(45) Date of Patent: Jan. 27, 2004

(54) CROSSLINKABLE ELASTROMER COMPOSITION, SEALING MATERIAL PRODUCED FROM THE COMPOSITION, AND FILLER FOR USE THEREIN

(75) Inventors: Hiroyuki Tanaka, Settsu (JP); Masanori Hasegawa, Settsu (JP); Tsuyoshi Noguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/743,709

(22) PCT Filed: Jul. 14, 1999

(86) PCT No.: PCT/JP99/03793

§ 371 (c)(1),
(2), (4) Date: Jan. 16, 2001

(87) PCT Pub. No.: WO00/04083

PCT Pub. Date: Jan. 27, 2000

(30) Foreign Application Priority Data

Jul. 17, 1998  (JP) ............................................. 10/204065

(51) Int. Cl.⁷ .............................. C08L 3/04; C08L 27/12
(52) U.S. Cl. ........................ 524/496; 524/546; 524/545
(58) Field of Search ................................. 524/495, 496, 524/545, 546; 502/416, 417, 418

(56) References Cited

U.S. PATENT DOCUMENTS 4,472,336 A    9/1984   Enoki et al.
5,461,107 A  * 10/1995  Amin et al. ................. 524/495

FOREIGN PATENT DOCUMENTS

| EP | 1 106 268 A1 | 6/2001 |
|---|---|---|
| JP | 51-40153 | 10/1976 |
| JP | 51-123279 | 10/1976 |
| JP | 57-172555 | 10/1982 |
| JP | 61-283659 | 12/1986 |
| JP | 1-213362 | 8/1989 |
| JP | 8-269267 | 10/1996 |
| JP | 8-311432 | 11/1996 |
| JP | 10-139970 | 5/1998 |
| WO | WO 95/02634 | 1/1995 |

OTHER PUBLICATIONS

Patent Abstracts of Japan, vol. 15, No. 100, Mar. 11, 1991 and JP 02 311567, Dec. 27, 1990.

* cited by examiner

Primary Examiner—Robert Deshon Harlan
(74) Attorney, Agent, or Firm—Sughrue Mion, PLLC

(57) ABSTRACT

A carbon black filler for crosslinkable elastomer composition having a content of impurity metals of not more than 300 ppm and a pH value of 5.0 to 11.0. The filler can be obtained by subjecting a starting carbon black filler to extraction treatment with an acid to reduce a content of impurity metals of the filler and then alkali treatment with an alkali to neutralize a remaining acid. The filler does not cause a crosslinking failure even when added to an elastomer composition and can provide an elastomer molded article suitable as a very clean sealing material for semiconductor production apparatuses.

18 Claims, No Drawings

CROSSLINKABLE ELASTOMER COMPOSITION, SEALING MATERIAL PRODUCED FROM THE COMPOSITION, AND FILLER FOR USE THEREIN

TECHNICAL FIELD

The present invention relates to a clean crosslinkable elastomer composition being capable of providing a sealing material to be used for sealing of semi-conductor production apparatuses and a carbon black filler which is added to the composition and has a reduced content of impurity metals.

BACKGROUND ART

In producing semiconductor elements, very high cleanliness is required, and the requirements for high cleanliness range over not only management of a production process of semiconductors but also semiconductor production apparatuses and parts thereof. If the parts of semiconductor production apparatuses are cleaned after built in the apparatuses, a degree of possible cleanliness is limited. Such parts are required to have been cleaned highly before built in the apparatuses. In production of semiconductors, there are problems with contamination, particularly micro particles so-called particles, organic additives and elution of metals, which have an adverse effect on accurate etching treatment.

Also cleanliness is required similarly in a sealing material for semiconductor production apparatuses which the present invention can be particularly suitably applied to. The applicant of the present invention has attained high cleanliness of the sealing material itself by employing a special method of cleaning the sealing material after molding (Japanese Patent Application No. 77781/1998).

Such a sealing material has been produced by crosslinking and molding a crosslinkable elastomer composition such as a rubber, and in order to impart mechanical properties, there is a case where a carbon black is added to the composition as a filler.

For cleaning a sealing material containing a carbon black as a filler, particularly for removing impurity metals, the above-mentioned method of extraction of impurity metals by washing the sealing material after molding with an acid, or the like and a method of adding a filler cleaned by washing with an acid can be considered. The present invention relates to the latter method of cleaning a filler itself. In that case, after adding the filler to an elastomer composition, the composition has to be crosslinked and molded. However when usual fillers obtained by cleaning with an acid was used, peroxide crosslinking which was a generally employed crosslinking method could not be carried out. Namely when the peroxide crosslinking is tried, those fillers cause crosslinking failure which not only lower mold-processability but also has an adverse effect on properties of molded article such as compression set, tensile strength and modulus.

DISCLOSURE OF INVENTION

An object of the present invention is to provide a carbon black filler which has a reduced content of impurity metals and does not cause crosslinking failure even if not only radiation crosslinking but also peroxide crosslinking is carried out.

Also an object of the present invention is to provide a crosslinkable elastomer composition which contains the carbon black filler and can be subjected to not only radiation crosslinking but also peroxide crosslinking.

Further the present invention relates to a sealing material obtained by crosslinking and molding the above-mentioned composition.

Namely the carbon black filler of the present invention has a content of impurity metals of not more than 300 ppm. Preferably pH is adjusted to 5.0 to 11.0.

The carbon black filler having a reduced content of impurity metals can be obtained by extraction treatment of a starting carbon black filler with an acid to reduce a content of impurity metals in the filler and then treatment with an alkali to neutralize the remaining acid.

The crosslinkable elastomer composition obtainable by adding the carbon black filler of the present invention to a fluorine-containing elastomer component or silicone-based elastomer component can be crosslinked and molded without causing a crosslinking failure and can give a sealing material having excellent mechanical properties. Then the sealing material is subjected to treatment by a special cleaning method described in the above-mentioned Japanese Patent application No. 77781/1998, namely a cleaning method with ultra pure water, a method of cleaning with a clean organic compound in the form of liquid at a washing temperature or a clean inorganic aqueous solution, a cleaning method by dry etching or an extraction cleaning method, and thereby a highly cleaned sealing material for semiconductor production apparatuses can be obtained.

BEST MODE FOR CARRYING OUT THE INVENTION

For the carbon black in the present invention, various grades of carbon blacks produced by various methods can be used. For example, there are SAF, ISAF, HAF, MAF, FEF, SRF, FT, MT, and the like. Among them, particularly suitable are carbon black having a specific surface are of not less than 3 $m^2$/g and DBP absorption of not less than 15 $cm^3$/100 g from the viewpoint of processability. Examples thereof are, for instance, N990, N550, N330, N220, and the like.

An average particle size of the carbon black filler of the present invention is from about 10 μm to about 600 μm.

A content of impurity metals of the carbon black filler of the present invention is not more than 300 ppm, preferably not more than 100 ppm, further preferably not more than 10 ppm. Reduction of impurity metals may be carried out by treating a starting carbon black with an acid such as sulfuric acid, nitric acid, hydrofluoric acid or hydrochloric acid to extract impurity metals.

Impurity metals contained particularly in a large amount are, for example, alkali metals such as Na, K and Li; alkaline earth metals such as Ca, Mg and Ba; Fe, Cu, Cr, Ni, Al, etc. which become a problem.

In the present invention, not to cause a crosslinking failure even if a carbon black is mixed to a crosslinkable elastomer composition, the carbon black is subjected to not only acid treatment but also treatment for neutralizing the acid being present on the acid-treated carbon black since the acid causes a peroxide crosslinking failure. The neutralizing treatment may be carried out by using an alkali. It is preferable to avoid use of an alkali containing metals from the viewpoint of reduction of contamination sources. Examples of the preferred alkali are, for instance, aqueous ammonia, basic amines such as triethanolamine, triethylamine and diethylamine, ammonia gas, and the like. Particularly from the viewpoint of handling property, separation and removal, aqueous ammonia having a concentration of 1 to 28% by weight is preferable. By the neutralizing treatment, a pH value which is 3.0 to 4.5 after the acid treatment is increased to 5.0 to 11.5. A preferred pH is 5.0 to 11.0.

The neutralizing treatment is easily carried out by dipping in an alkaline solution. Also a method of spraying an alkaline solution may be used.

It is further preferable that after the neutralizing treatment, washing with a clean chemical solution such as ultra pure water is carried out to remove generated salt and remaining micro particles.

The carbon black filler subjected to neutralizing treatment and washing is separated and dried. It is preferable to carry out the drying in a clean atmosphere such as a clean gas. Examples of the preferably used clean gas are, for instance, high purity inert gases such as nitrogen gas, helium gas and argon gas. It is preferable that the drying is carried out by pre-drying at 50° to 150° C. for 5 to 24 hours and further heating at 200° to 300° C. for 1 to 24 hours.

In addition to the above-mentioned neutralizing method, the neutralizing treatment may be carried out by a method of merely washing with a clean chemical solution such as ultra pure water or a method of exposing to ammonia gas. Examples of the clean chemical solution to be used preferably are ultra pure water which has a metal content of not more than 1.0 ppm and does not contain micro particles of not less than 0.2 $\mu$m in an amount of more than 300 per 1 ml and an organic compound in the form of liquid at a washing temperature or inorganic aqueous solution which has a metal content of not more than 1.0 ppm and does not contain micro particles of not less than 0.5 $\mu$m in an amount of more than 200 per 1 ml.

The clean carbon black filler of the present invention is added to the crosslinkable elastomer to give a crosslinkable elastomer composition. An adding amount thereof is from 1 to 150 parts by weight (hereinafter referred to as "part"), preferably 1 to 60 parts on the basis of 100 parts of the elastomer component. When much amount of the filler is added, an amount of dropped-off filler increases, which easily causes generation of particles.

The elastomer component is not limited particularly. When it is used as a starting material for a sealing material for semi-conductor production apparatuses, a fluorine-containing elastomer and silicone elastomer are preferable.

Examples of the fluorine-containing elastomer are, for instance, as follows.

Perfluoro elastomer comprising 40 to 90% by mole of tetrafluoroethylene, 10 to 60% by mole of perfluoro(vinyl ether) represented by the formula (1):

$$CF_2=CF-OR_f$$

wherein $R_f$ is a perfluoroalkyl group having 1 to 5 carbon atoms or a perfluoroalkyl(poly)ether group having 3 to 12 carbon atoms and 1 to 3 oxygen atoms, and 0 to 5% by mole of a monomer giving a curing moiety.

Vinylidene fluoride elastomer comprising 30 to 90% by mole of vinylidene fluoride, 15 to 40% by mole of hexafluoropropylene and 0 to 30% by mole of tetrafluoroethylene.

Thermoplastic perfluoro elastomer which is a fluorine-containing multi-segment polymer comprising an elastomeric fluorine-containing polymer chain segment and a non-elastomeric fluorine-containing polymer chain segment, in which the elastomeric fluorine-containing polymer chain segment comprises 40 to 90% by mole of tetrafluoroethylene, 10 to 60% by mole of perfluoro(vinyl ether) represented by the formula (1):

$$CF_2=CF-OR_f$$

wherein $R_f$ is a perfluoroalkyl group having 1 to 5 carbon atoms or a perfluoroalkyl(poly)ether group having 3 to 12 carbon atoms and 1 to 3 oxygen atoms, and 0 to 5% by mole of a monomer giving a curing moiety, and the non-elastomeric fluorine-containing polymer chain segment comprises 85 to 100% by mole of tetrafluoroethylene and 0 to 15% by mole of a compound represented by the formula (2):

$$CF_2=CF-OR_f^1$$

wherein $R_f^1$ is $CF_3$ or $OR_f^2$, in which $R_f^2$ is a perfluoroalkyl group having 1 to 5 carbon atoms.

Fluorine-containing multi-segment polymer comprising an elastomeric fluorine-containing polymer chain segment and a non-elastomeric fluorine-containing polymer chain segment, in which the elastomeric fluorine-containing polymer chain segment contains recurring units derived from 45 to 85% by mole of vinylidene fluoride and at least one other monomer copolymerizable with vinylidene fluoride, respectively. Examples of the other monomer are hexafluoropropylene, tetrafluoroethylene, chlorotrifluoroethylene, trifluoroethylene, trifluoropropylene, tetrafluoropropylene, pentafluoropropylene, trifluorobutene, tetrafluoroisobutene, perfluoro(alkyl vinyl ether), vinyl fluoride, ethylene, propylene, alkylvinylether, and the like.

Cold resistant fluorine-containing elastomer prepared by radical polymerization in the presence of a di-iodine compound and comprising 0.005 to 1.5% by mole of iodine-containing fluorinated vinyl ether unit, 40 to 90% by mole of vinylidene fluoride unit and 3 to 35% by mole of perfluoro(methyl vinyl ether) unit (as case demand, hexafluoropropylene unit of up to 25% by mole and/or tetrafluoroethylene unit of up to 40% by mole may be contained) (JP-A-8-15753).

Copolymer comprising tetrafluoroethylene and propylene (U.S.Pat. No. 3,467,635).

Examples of the preferred silicone elastomer are, for instance, silicone rubber, fluoro silicone rubber, and the like.

The elastomer composition can be crosslinked and molded into desired forms of products. As a crosslinking method, though peroxide crosslinking is usual, crosslinking by irradiating radioactive rays and electron beams may be used.

When carrying out organic peroxide crosslinking, to 100 parts of the elastomer component are added an organic peroxide in an amount of from 0.05 to 10 parts, preferably 0.1 to 2.0 parts and a crosslinking aid in an amount of from 0.1 to 10 parts, preferably 0.3 to 5.0 parts. In addition, a processing aid, internal mold releasing agent, and the like may be added. The organic peroxide crosslinking can be carried out by usual method, and there arise no crosslinking failure as occurred before.

The crosslinkable elastomer composition of the present invention can be used suitably for a sealing material, particularly for production of a sealing material for sealing of semiconductor production apparatuses, in which high cleanliness is demanded. Examples of the sealing material are O-ring, gasket, packing, oil seal, bearing seal, lip seal, and the like.

In addition, the crosslinkable elastomer composition can be used for a variety of elastomer products, for example, diaphragm, tube, hose, various rolls, and the like.

The present invention is then explained by means of examples, but is not limited to them.

PREPARATION EXAMPLE 1

100 Gram of carbon black (N990, specific surface area: 6 m$^2$/g, DBP absorption: 50 cm$^3$/100 g, impurity metals shown in Table 1 are contained, average particle size: 500 µm, pH: 10.0) was dispersed in 300 ml of 15% by weight of sulfuric acid, followed by treating with an acid at room temperature for three hours with stirring. The treated carbon black was filtrated and separated through a polytetrafluoroethylene filter and washed with 2,000 ml of ultra pure water. The washed carbon black (pH: 3.8) was dispersed in 300 ml of 10% by weight of aqueous ammonia and neutralized at room temperature for three hours with stirring. The obtained neutralized carbon black was washed with 2,000 ml of ultra pure water and filtrated and separated through a polytetrafluoroethylene filter. Then the carbon black was pre-dried at 120° C. for ten hours in a clean dryer, and further dried at 250° C. for five hours to give the carbon black filler of the present invention. A pH value and contents of impurity metals thereof were measured by the following methods. As a result, a pH value was 6.0, and contents of impurity metals were reduced as shown in Table 1.

(pH)

3 Gram of carbon black filler was dispersed in 30 ml of ultra pure water, followed by stirring at room temperature with a magnetic stirrer for one hour. Then a pH value of the ultra pure water was measured with a pH meter.

(Contents of Impurity Metals)

0.5 To 2.0 g of carbon black filler or molded article, i.e. O-ring was put in a clean platinum crucible and heated at 600° C. for two hours to carry out ashing sufficiently. To the ash remaining in the crucible was added 5 ml of hydrochloric acid, followed by heating in a hot bath for dissolving and then diluting with ultra pure water. Metal contents of the solution were determined through atomic absorption analysis with an atomic absorption spectron photometer (Z8000 available from Hitachi, Ltd.). The contents of each metal in the filler were calculated by the following equation.

$$\text{Metal content (\% by weight)} = \frac{\text{Concentration in solution (\% by weight)}}{\text{Weight of filler (g)}} \times \text{Weight of solution (g)}$$

EXAMPLE 1

To 100 g of tetrafluoroethylene/perfluoro(alkyl vinyl ether) copolymer elastomer were kneaded 20 g of carbon black filler of the present invention obtained in Preparation Example 1, 1 g of 2,5-dimethyl-2,5-di(t-butylperoxy)hexane (PERHEXA 25B available from NOF Corporation) and 3 g of triallylisocyanurate (TAIC) (available from Nippon Kasei Kabushiki Kaisha) to give the elastomer composition of the present invention, and a crosslinking test was carried out at 160° C. with JSR Curastometer Model II. The results are shown in Table 2. Then the elastomer composition was molded into O-ring by compression molding at 160° C. for 10 minutes, followed by secondary crosslinking at 180° C. for four hours.

With respect to the obtained O-ring, physical properties in normal state and compression set (CS) were measured according to JIS K 6301. The results are shown in Table 2.

COMPARATIVE EXAMPLE 1

To 100 g of tetrafluoroethylene/perfluoro(alkyl vinyl ether) copolymer elastomer were kneaded 20 g of carbon black (N990) used as a starting material in Preparation Example 1, 1 g of PERHEXA 25B and 3 g of TAIC to give an elastomer composition for comparison. Then a crosslinking test was carried out in the same manner as in Example 1 (Table 2), the composition was molded into O-ring and physical properties in normal state and compression set were measured (Table 2).

TABLE 1

| (ppm) | Carbon black prepared in Preparation Example 1 | Carbon black used in Preparation Example 1 (N-990) |
|---|---|---|
| Na | 1 | 390 |
| K | 0.1 | 10 |
| Ca | 0.1 | 1 |
| Mg | 0.04 | 2 |
| Fe | 0.9 | 1 |

TABLE 2

| | Com. Ex. 1 | Ex. 1 |
|---|---|---|
| Crosslinking test (160° C.) | | |
| Minimum viscosity (kgf) | 0.10 | 0.10 |
| Maximum viscosity (kgf) | 6.40 | 6.45 |
| Induction period (min) | 0.6 | 0.7 |
| Optimum vulcanization time (min) | 1.0 | 1.1 |
| Physical properties in normal state | | |
| 100% tensile stress (kgf/cm$^2$) | 145 | 147 |
| Tensile strength (kgf/cm$^2$) | 220 | 222 |
| Elongation (%) | 140 | 140 |
| Hardness (JIS A) | 82 | 82 |
| C.S (P-24, O-ring) | | |
| 200° C. × 70 hours (%) | 10 | 10 |
| Analysis of impurity metals (ppm) | | |
| Na | 80 | 2 |
| K | 2 | 0.5 |
| Fe | 1 | 0.5 |

INDUSTRIAL APPLICABILITY

The carbon black filler of the present invention does not cause a crosslinking failure even when added to an elastomer composition and can provide an elastomer molded article suitable as a very clean sealing material for semiconductor production apparatuses.

What is claimed is:

1. A carbon black filler for crosslinkable elastomer composition, which contains impurity metals in an amount of not more than 300 ppm, and has a pH value adjusted to 5.0 to 11.0.

2. The carbon black filler of claim 1, wherein a specific surface area and DBP absorption of the carbon black are not less than 3 m$^2$/g and not less than 15 cm$^3$/100 g, respectively.

3. A process for preparing a carbon black filler for crosslinkable elastomer composition containing impurity metals in an amount of not more than 300 ppm, wherein a starting carbon black filler is subjected to extraction treatment with an acid to reduce a content of impurity metals and then treated with an alkali to neutralize a remaining acid.

4. The process for preparing the carbon black filler of claim 3, wherein the neutralizing treatment with an alkali is carried out in aqueous ammonia and the separated carbon black filler is dried in a clean gas atmosphere.

5. A crosslinkable elastomer composition for a sealing material comprising the carbon black filler of claim 1 and a crosslinkable elastomer component.

6. The crosslinkable elastomer composition of claim 5, wherein said carbon black filler is added in an amount of 1 to 150 parts by weight on the basis of 100 parts by weight of the elastomer component.

7. The crosslinkable elastomer composition of claim 5, wherein the composition comprises 0.05 to 10 parts by weight of an organic peroxide, 0.1 to 10 parts by weight of a crosslinking aid and 1 to 150 parts by weight of said carbon black filler on the basis of 100 parts by weight of the elastomer component.

8. The elastomer composition of claim 5, wherein the elastomer component is a fluorine-containing elastomer or a silicone elastomer.

9. A sealing material obtained by crosslinking and molding the elastomer composition of claim 5.

10. The sealing material of claim 9 which is used for sealing of semi-conductor production apparatuses.

11. A carbon black filler for crosslinkable elastomer composition, which contains impurity metals in an amount of not more than 300 ppm, and has a specific surface area and DBP absorption of the carbon black of not less than 3 $m^2/g$ and not less than 15 $cm^3/100$ g, respectively.

12. The carbon black filler of claim 11, which has a pH value adjusted to 5.0 to 11.0.

13. A crosslinkable elastomer composition for a sealing material comprising the carbon black filler of claim 11 and a crosslinkable elastomer component.

14. The crosslinkable elastomer composition of claim 13, wherein said carbon black filler is added in an amount of 1 to 150 parts by weight on the basis of 100 parts by weight of the elastomer component.

15. The crosslinkable elastomer composition of claim 13, wherein the composition comprises 0.05 to 10 parts by weight of an organic peroxide, 0.1 to 10 parts by weight of a crosslinking aid and 1 to 150 parts by weight of said carbon black filler on the basis of 100 parts by weight of the elastomer component.

16. The elastomer composition of claim 13, wherein the elastomer component is a fluorine-containing elastomer or a silicone elastomer.

17. A sealing material obtained by crosslinking and molding the elastomer composition of claim 13.

18. The sealing material of claim 17 which is used for sealing of semi-conductor production apparatuses.

* * * * *